Patented May 2, 1933

1,906,667

UNITED STATES PATENT OFFICE

EDUARD TSCHUNKUR AND WALTER BOCK, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ARTIFICIAL RUBBER LIKE VULCANIZATES

No Drawing. Application filed June 13, 1930, Serial No. 461,044, and in Germany June 17, 1929.

The present invention relates to new artificial rubber-like vulcanizates derived from mixtures of natural rubber and artificial rubber-like masses.

We have found that by vulcanizing mixtures of natural rubber varieties and artificial rubber-like masses, after having incorporated therewith a vulcanizing agent, such as sulfur, selenium, aromatic nitro compounds+metal oxides and the like, and finely divided carbon, more particularly carbon black, lamp black, oil soot or the like, with or without the addition of other filling materials, such as zinc oxide, coloidal silicic acid, etc., and furthermore, if desired, with the addition of a vulcanization accelerator, plastifying agents or other materials known to favorably influence vulcanization processes, such as tar, oils, stearic acid, resins, etc., vulcanizates are obtainable which in many cases are superior in their mechanical or other technically valuable properties to vulcanizates obtainable in a similar manner from the constituent rubber or rubber-like materials of the mixtures.

The mixtures of natural rubber varieties with the artificial rubber-like masses may be prepared in the most various manner. For example, a rubber-forming diolefine hydocarbon, more particularly butadiene or a homologue or analogue thereof, such as isoprene, 2.3-dimethylbutadiene or the like, may be polymerized according to any desired polymerization process in the presence of natural rubber or latex. Suitable polymerization processes for this method of working are, for example, polymerization in the presence of an alkali metal, more particularly sodium metal, polymerization in emulsion with water and an emulsifying agent or polymerization by simple heating, with or without the addition of ingredients known to favorably influence such polymerization processes. Another method of preparing our mixtures of natural rubber and artificial rubber-like masses is by mechanically mixing these compounds, for example, on rollers or in a kneading machine. Furthermore, the constituents may in many cases be dissolved in rubber dissolving solvents, such as benzene, ether, tetrachloromethane, ligroin and the like with the addition of finely divided carbon, other filling materials, vulcanizing agents, accelerators, etc., such solutions being suitable for impregnating purposes, yielding after vulcanization of the impregnated materials coating of technically valuable properties. The manufacture of the vulcanization mixtures from the solid natural rubber/artificial rubber-like masses may be performed in the usual manner, for example, by rolling or kneading in the finely divided carbon (preferably in an amount between about 20–70% by weight of the rubber/rubber-like mass mixture) and other ingredients of the vulcanization mixture, and it may be mentioned that this rolling or kneading operation is easy to perform in view of the unexpected, great plasticity of the mixtures of natural rubber with artificial rubber-like masses, which generally is substantially greater than that of the artificial rubber-like masses, which in many cases are workable on rollers or in kneading machines only with difficulty. It has already been proposed to overcome this difficulty by the addition of plastifying agents to the artificial rubber-like masses. But by these additions the mechanical properties of the vulcanizates generally are impaired, whereas our mixtures yield vulcanizates of superior mechanical properties, amounting in most cases to a tensile strength between about 180–250 kg/sqcm at a stretch between about 500–800%. The quantity of natural rubber to be added should not amount to less than 10% by weight of the rubber/rubber-like mass mixture, the best results generally being obtainable with about 25–60% of natural rubber.

The vulcanization of the vulcanization mixtures as defined above may be performed in the usual manner, for example, by heating to about 100–140° C. for about 20–140 minutes, but it may be mentioned that these figures are in no way limitative, lower or higher temperatures, or shorter or longer times of vulcanization being operable in most cases. The vulcanizates thus obtainable may be used for the manufacture of high grade tires, tubes, transporting bands, driving belts, surface coatings, stuffings and the like. In many cases these fabrics are superior in their quality compared with those obtainable from only artificial rubber-like masses or natural rubber, i. e. either by their mechanical properties or by their resistance to low temperatures, their resistance to the attack of chemical agents or their good rubbing properties.

The following examples illustrate our invention without limiting it thereto, the parts being by weight.

*Example 1*

3 parts of sulfur, 15 parts of zinc oxide, 2 parts of tar, 2 parts of stearic acid, 50 parts of carbon black and 1 part of diphenyl-guanidine are rolled into 100 parts of a mixed rubber-like mass, containing 50 parts of artificial rubber, which mass has been obtained by polymerizing butadiene-(1.3) by simple heating to 60–70° C. in the presence of natural rubber. The mixture is vulcanized at a temperature of about 130–140° C. in the usual manner. A high grade, elastic vulcanizate is thus obtained, possessing a tensile strength of 220–250 kg/sqcm at a stretch of 700–750% and an elasticity of 48–50%.

*Example 2*

65 parts of a rubber-like polymerizate obtained by polymerizing butadiene in the presence of sodium metal are mixed by rolling or kneading with 35 parts of natural rubber, 70 parts of carbon black, 1 part of sulfur, 5 parts of zinc oxide, 4 parts of tar, 2 parts of stearic acid and 1.8 parts of a 50–60% alcoholic solution of the decahydroquinaldine salt of the dithiocarbamate derived from decahydroquinaldine and the mixture is vulcanized at 143° C. for 50–60 minutes. The vulcanizates thus obtainable possess a tensile strength of about 200–220 kg/sqcm at a stretch of about 600–700%, and it may be mentioned that the above mixture is especially valuable for the manufacture of high grade tires for vehicles.

*Example 3*

70 parts of a rubber-like mass, obtained by polymerizing a mixture of equal parts of butadiene-(1.3) and 2.3-dimethylbutadiene-(1.3) in emulsion with water and an emulsifying agent, 30 parts of natural rubber and the other ingredients, as outlined in Example 1, are mixed in rollers and vulcanized in the usual manner. A vulcanizate is thus obtained, likewise possessing good mechanical properties.

*Example 4*

A tube is manufactured on a coronary press from a mixture consisting of 100 parts of a rubber-like mass obtained by polymerizing butadiene-(1.3) in the presence of sodium metal and a diluting agent
100 parts of natural rubber
80 parts of active gas soot
20 parts of inactive gas soot
5 parts of zinc oxide
10 parts of stearic acid
4 parts of sulfur
2 parts of a substance being able to protect rubber goods against deterioration due to age and
2 parts of a vulcanization accelerator.

The mixture, in view of its great plasticity, is easily workable on the coronary press and the tube obtainable by vulcanizing in the usual manner ($t=140°$ C.) possesses good mechanical properties and good resistance to chemical agents.

*Example 5*

A solution is prepared in a rubber solvent of 100 parts of a butadiene rubber (as used in Example 4) and 100 parts of natural rubber. To this solution are added:

80 parts of oil soot
4 parts of a soft resin (obtainable according to Brit. Pat. 323 322)
6 parts of zinc oxide
2 parts of a substance being able to protect rubber goods against deterioration due to age
5 parts of sulfur
0,6 part of mercaptobenzothiazole and
0,6 part of diphenylguanidine.

The mixture is applied for impregnating purposes of the most various kind and the impregnated fabrics are vulcanized in the usual manner.

*Example 6*

Into a mixture of 50 parts of butadiene-sodium rubber and 50 parts of natural rubber 70 parts of carbon black
20 parts of zinc oxide
5 parts of pine tar oil
5 parts of a soft resin (obtainable according to Brit. Pat. 328 190)
1 part of a substance being able to protect rubber goods against deterioration due to age
2 parts of sulfur and
2 parts of diphenylguanidine are rolled in and the mixture is calendered together with a linen strip and vulcanized while pressing. Driving belts of very satisfactory stability and good resistance to rubbing are thus obtained.

*Example 7*

39 parts of a rubber-like mass obtained by polymerizing 2.3-dimethylbutadiene in emulsion with water and an emulsifying agent, are mixed on rollers or in a kneading machine together with 39 parts of natural rubber, 3,15 parts of sulfur, 9,4 parts of zinc oxide, 1 part of tar, 1 part of stearic acid, 50 parts of carbon black and 1 part of diphenylguanidine and the mixture is vulcanized at 136° C. for 50–70 minutes. The vulcanizates thus obtainable which are valuable for the manufacture of driving belts, transporting bands and the like, possess a tensile strength of 180–200 kg/sqcm at a stretch of 500–600%.

We claim:—

1. As a new product, a rubber-like vulcanizate comprising a mixture consisting of a butadiene hydrocarbon polymerization product and of at least 10% by weight of natural rubber, finely divided carbon in an amount equal to between about 20 to 70% by weight of said mixture, and a vulcanizing agent, said vulcanizate generally possessing a tensile strength between about 180 to 250 kg/sqcm at a stretch of about 500 to 800%.

2. As a new product, a rubber-like vulcanizate comprising a mixture consisting of a polymerized hydrocarbon of the probable formula:

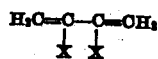

wherein X means hydrogen or methyl, and of between about 25 to 60% by weight of natural rubber, a soot variety of the group consisting of carbon black, lamp black and oil soot in an amount equal to between about 20 to 70% by weight of said mixture and sulfur, said vulcanizate generally possessing a tensile strength between about 180 to 250 kg/sqcm at a stretch of about 500 to 800%.

3. As a new product, a rubber-like vulcanizate comprising a mixture consisting of an artificial rubber-like mass obtained by polymerizing butadiene in the presence of an alkali metal and of between about 25 to 60% by weight of natural rubber, a soot variety of the group consisting of carbon black, lamp black and oil soot in an amount equal to between about 20 to 70% by weight of said mixture and sulfur, said vulcanizate generally possessing a tensile strength between about 180 to 250 kg/sqcm at a stretch of about 500 to 800%.

4. As a new product, a rubber-like vulcanizate comprising a mixture consisting of an artificial rubber-like mass obtained by polymerizing butadiene in the presence of sodium metal and of between about 25 to 60% by weight of natural rubber, a soot variety of the group consisting of carbon black, lamp black and oil soot in an amount equal to between about 20 to 70% by weight of said mixture and sulfur, said vulcanizate generally possessing a tensile strength between about 180 to 250 kg/sqcm at a stretch of about 500 to 800%.

5. As a new product, a rubber-like vulcanizate comprising 65 parts by weight of a polymerizate obtainable by polymerizing butadiene-(1.3) in the presence of sodium metal, 35 parts by weight of natural rubber and 70 parts by weight of carbon black, said vulcanizate possessing a tensile strength between about 200 to 220 kg/sqcm at a stretch of about 600 to 700%.

In testimony whereof, we affix our signatures.

EDUARD TSCHUNKUR.
WALTER BOCK.